(12) United States Patent
Iseli

(10) Patent No.: US 7,246,967 B2
(45) Date of Patent: Jul. 24, 2007

(54) CROSS CLAMPING DEVICE

(75) Inventor: Hansrudolf Iseli, Allschwil (CH)

(73) Assignee: Habasit AG, Reinach (CH)

( * ) Notice: Subject to any disclaimer, the term of this patent is extended or adjusted under 35 U.S.C. 154(b) by 13 days.

(21) Appl. No.: 10/799,273

(22) Filed: Mar. 12, 2004

(65) Prior Publication Data

US 2004/0179894 A1  Sep. 16, 2004

(30) Foreign Application Priority Data

Mar. 14, 2003  (EP) .................... 03405176

(51) Int. Cl.
*E04G 7/12*  (2006.01)
(52) U.S. Cl. .............. 403/400; 411/354; 403/403
(58) Field of Classification Search .......... 403/400, 403/403, 231, 232.1, 256, 382; 411/354, 411/398–9, 166; 280/86.753
See application file for complete search history.

(56) References Cited

U.S. PATENT DOCUMENTS

| 3,550,969 A | * | 12/1970 | Robinson ............... 403/8 |
| 4,032,245 A | | 6/1977 | Woodruff |
| 5,310,299 A | * | 5/1994 | Bernstein ............... 411/354 |
| 5,718,403 A | | 2/1998 | Ott et al. |
| 5,833,225 A | * | 11/1998 | Weber ............... 269/138 |
| 5,961,248 A | * | 10/1999 | Tourtellotte ............... 403/400 |
| 6,685,385 B1 | * | 2/2004 | Ledingham ............... 403/400 |

FOREIGN PATENT DOCUMENTS

| DE | 35 31 674 A1 | | 3/1986 |
| GB | 2 241 735 A | | 9/1991 |
| GB | 2241735 A | * | 9/1991 |

* cited by examiner

*Primary Examiner*—Daniel P. Stodola
*Assistant Examiner*—Joshua T. Kennedy
(74) *Attorney, Agent, or Firm*—Hodgson Russ LLP

(57) ABSTRACT

A cross clamping device comprises a base plate with first and second legs and a clamping piece that connects the two legs with each other. The cross clamping device also comprises a first clamp screwed onto the first leg by a first screw, and a second clamp screwed onto the second leg by a second screw. The base plate and the two clamps are formed such that a first bar and a second bar, which is rotated by 90° in relation to the first bar, are able to be clamped. By tightening of the first and second screws, the two bars are clamped. The two screws perform a double function, so that separate screws for clamping of the first bar and for clamping of the second bar are not necessary.

9 Claims, 2 Drawing Sheets

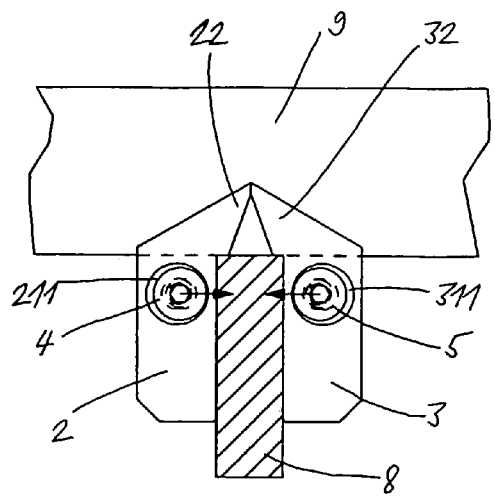
Fig. 1
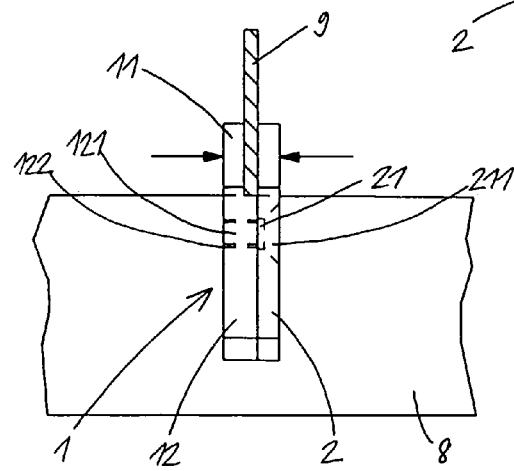
Fig. 2
Fig. 3
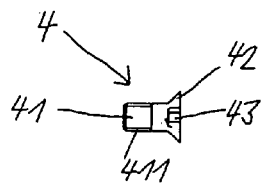
Fig. 4 Fig. 5
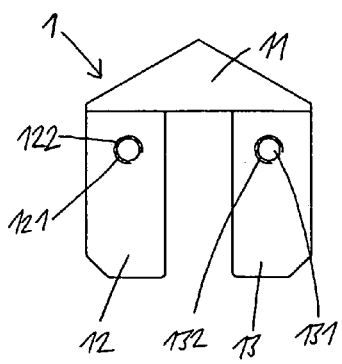 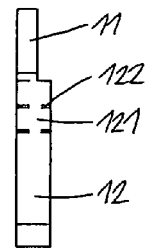
Fig. 6 Fig. 7
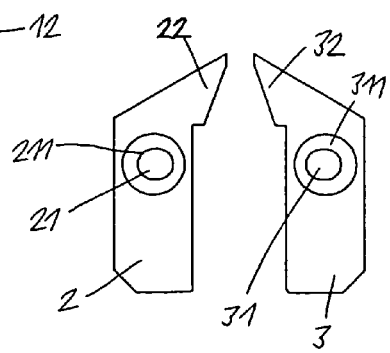 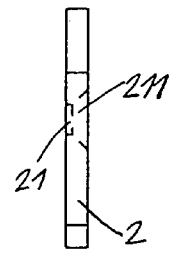

CROSS CLAMPING DEVICE

CROSS-REFERENCE TO RELATED APPLICATIONS

This application claims priority to European patent application 03405176.3 filed Mar. 14, 2003, which is incorporated herein by reference.

BACKGROUND OF THE INVENTION

The present invention relates to a cross clamping device to clamp two bars, which are rotated by 90° to each other.

In the context of this patent application, sheet metal strips and the like are also subsumed under the term bar.

There are many possibilities to connect two bars which are perpendicular to each other. For example, both bars can be directly screwed onto a common connection piece independently of each other, which has the disadvantage however that the bars must be provided with screw holes. In order to avoid this, both bars can be clamped independently from each other, each between two clamping pieces, which are connected with the clamping pieces of the other bar. The clamping pieces clamping a bar can be screwed together, such that the clamping force is produced by the action of screwing the pieces together. A disadvantage of this method of connection is that rather a lot of, or otherwise complicated, individual parts are necessary, in particular two screws per bar, if a good clamping effect is required.

In view of the disadvantages of the aforementioned types of connection, the object of the invention is to provide a device to connect two bars which are perpendicular to each other, which has a few simple individual pieces, with which a stable connection can be produced.

This object is achieved by the cross clamping device of this invention, which is characterized by the features of the following description and the appended claims.

The essence of the invention is the following: a cross clamping device comprising a base plate, which has a first and a second leg and a clamping piece which connects the two legs together, a first clamp, which is screwed onto the first leg by means of a first screw, and a second clamp, which is screwed onto the second leg by means of a second screw. The base plate and the two clamps are designed such that a first bar is able to be clamped between the first and the second clamp and a second bar is able to be clamped between the two clamps and the clamping piece of the base plate, the second bar being rotated by 90° in relation to the first bar. The first and the second screw each have a head, which is at least partially conical shaped, so that by the tightening of the first and of the second screw, the first and the second clamp are pressed against the first bar by the slanting conical surface and the two bars are clamped.

By the tightening of the first and of the second screw, the particular screw head, owing to the slanting surface, pushes the relevant clamp against the first bar. In this manner a clamping force can be produced perpendicular to the direction of screwing, which brings about the clamping of the first bar between the two clamps.

A significant advantage of the cross clamping device of this invention is that by means of tightening the two screws, the first bar, which is arranged between the first and the second clamp, as well as the second bar, which is arranged between the two clamps and the clamping piece of the base plate, are clamped, i.e. the two screws perform a double function, so that separate screws for the clamping of the first bar and the clamping of the second bar are not necessary. That helps to keep the number of parts low. Also by using few individual parts and by their optimal combination, it makes the device easy to clean. Since the screws perform a double function, this additionally has the advantage that the first and the second bar can be more quickly connected with each other by means of the cross clamping device of this invention.

The cross clamping device of this invention can, in particular, be employed everywhere where rails, guides, supports and the like lie on traverse bearing rods and must be held in place.

With an embodiment of the cross clamping device of this invention, which is preferably used for certain purposes, at least one of the two clamps is additionally screwed on the accompanying leg of the base plate by means of a further screw. In this manner a stronger clamping of the first bar between the two clamps can be achieved, which can be useful for heavy loads.

Preferably each of the screws has a shaft with a thread and also has a head, while the first leg of the base plate has at least a first hole with a thread, into which the first screw is screwed, and the second leg of the base plate has at least a second hole with a thread, into which the second screw is screwed. The screws are screwed with the shaft into the threaded holes in the legs of the base plate, while the heads of the screws press the clamps against the base plate.

Preferably at least one of the two clamps has a through hole, whose diameter, at least in a direction towards the first bar, is greater than the diameter of the screw shaft. Thereby the screw in the through hole is a little loose, so that the clamps can be at least a little displaced perpendicular to the screw and so a clamping force can be produced on the first bar.

Preferably the through hole, or more specifically at least one of the through holes, has an enlargement which is on the side opposite from the base plate, in which the head of the accompanying screw is at least partially inserted. This at least partial sinking of the screw head in the enlargement ensures that the screw does not project out, or at least does not project so far out of the clamp. The cross clamping device is thereby made easier to clean.

Preferably the enlargement, at least on the side which is on the same side as the first bar, is bordered by a slanting surface of the clamp, such that by the tightening of the screw, the clamp is pressed against the first bar by the screw which is pressing on the slanting surface. In this manner a clamping force can be produced which is perpendicular to the direction of screwing, which achieves the clamping of the first bar between the two clamps. Optimally, at the same time, the head of the screw is at least partially conical shaped, as previously described, such that two slanting surfaces come to lie on each other.

Preferably the clamping piece of the base plate is thinner than the two legs and/or the clamps are thinner in the region of the clamping piece of the base plate than in the region of the legs, so that a space exists between the two clamps and the clamping piece of the base plate, in which the second bar is able to be clamped, while the clamps lie on the legs. Such a form of the base plate and of the clamps guarantees a strong clamping of the second bar in a compact cross clamping device without spaces which are susceptible to dirt.

In a preferred embodiment the two clamps each have at one their ends a projection which extends to the other clamp, in which the two projections touch each other. By the tightening of the screws the touching projections achieve a slight turning of the clamps, which strengthens the clamping of the first bar.

Preferably the two clamps lie flat on the first bar and on the second bar. Thereby a flat and more stable transmission of the clamping force is guaranteed.

BRIEF DESCRIPTION OF THE DRAWINGS

In the following four embodiments of the cross clamping device of this invention are described in more detail with reference to the accompanying figures, in which:

FIG. 1—shows a view from the front of a first embodiment of the cross clamping device of this invention with two clamped bars;

FIG. 2—shows a side view of the cross clamping device with the two clamped bars of FIG. 1;

FIG. 3—shows a screw of the cross clamping device of FIG. 1;

FIG. 4—shows a view from the front of the base plate of the cross clamping device of FIG. 1;

FIG. 5—shows a side view of the base plate of FIG. 4;

FIG. 6—shows a view from the front of the two clamps of the cross clamping device of FIG. 1;

FIG. 7—shows a side view of the clamps of FIG. 6;

DETAILED DESCRIPTION OF THE INVENTION

Figure 8:
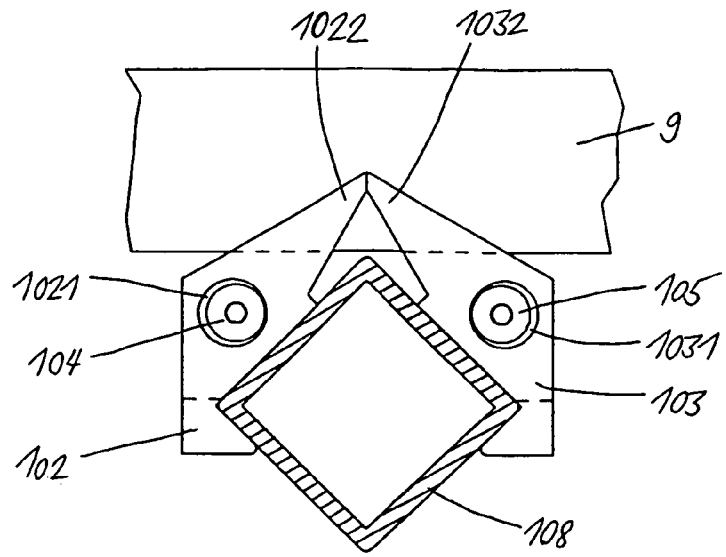
FIG. 8—shows a view from the front of a second embodiment of the cross clamping device of this invention with two clamped bars.

The first embodiment, presented in FIGS. 1 to 7, of a cross clamping device of this invention comprises a base plate 1, on which a first clamp 2 and a second clamp 3 are screwed by means of a first screw 4 and a second screw 5. A first bar 8 is clamped between the first clamp 2 and the second clamp 3, while a second bar 9, which is rotated by 90° in relation to the first bar 8, is clamped between the base plate 1 and the two clamps 2 and 3.

The base plate 1 comprises a first leg 12, a second leg 13, as well as a clamping piece 11, which connects the two legs 12, 13 with each other at one of their ends. The sides of the legs 12 and 13 which are on the same side to each other are parallel to each other. The first leg 12 has a hole 121, which is provided with a thread 122, while the second leg 13 has a hole 131, which is provided with a thread 132. The two legs 12, 13 are symmetrically formed, so that among other things the two holes 121, 131, in which the two screws 4, 5 are screwed into, have the same distance to the end of each leg 12, 13.

The clamping piece 11 of the base plate 1 is roof-like shaped and is thinner than the two legs 12, 13, so that a space exists between the clamping piece 11 and the two clamps 2, 3, in which the second bar 9 is clamped.

The first screw 4 has a shaft 41 with a thread 411 and has also a head 42. The head 42 is conical shaped and is provided with a hexagonal recess 43, in which a hexagonal key is able to be inserted for the rotation of the screw 4. The second screw 5 is formed in a corresponding manner to the first screw 4.

The first and the second clamp 2 and 3 each have an elongated through hole 21 and 31 respectively, whose diameter in a direction towards the first bar 8 is greater than the diameter of the screw shaft 41. Thereby the clamps 2 and 3 are movable by a small amount, for example 1 to 3 mm, perpendicular to screws 4 and 5 respectively, which are screwed into base plate 1. The through holes 21 and 31 have an enlargement 211 and 311 respectively on the side opposite from the base plate 1, in which the head 42 of the screw 4 or the head of the screw 5 respectively, is inserted. The enlargement 211, 311 is bordered all around by a slanting surface of the clamp 2 or 3 respectively.

At one of their ends the two clamps 2, 3 each have a projection 22 or 32 respectively, which extends to the other clamp 3, 2, wherein the two projections 22, 32 touch each other.

The first bar 8 is here a bar which is rectangularly shaped in cross section, while the second bar 9 is a much thinner sheet metal strip.

The first bar 8 is arranged between the first clamp 2 and the second clamp 3, which lies flat on them, and keeps these so far from each other, that the screws 4, 5 are situated in the elongated through holes 21, 31 at their ends which are on the same side as the first bar 8. By the tightening of the screws 4, 5 these press with the conical shaped heads on the slanting surfaces of the clamps 2 and 3, which border the enlargements 211, 311, through which the clamps 2, 3 are pressed against the first bar 8 and wedge these together. The clamping forces are indicated in FIG. 1 with arrows. The projections 22 and 32 which touch each other achieve a torque, which presses the ends of the clamps 2, 3 which do not have the projections 22, 32 more strongly against the first bar 8.

The second bar 9 is arranged between the clamping piece 11 of the base plate 1 and the projections 22, 32 of the clamps 2, 3, which by the tightening of the screws 4, 5 is pressed against the second bar 9. The clamping force, which is shown in FIG. 2 with arrows, arises from the fact that the second bar 9 is a little thicker, for example between 0.1 and 1 mm, than the difference of the thickness of the two legs 12, 13 and of the clamping piece 11.

The second embodiment which is presented in FIG. 8 of a cross clamping device of this invention is differentiated from the first embodiment by the form of the first clamp 102, the second clamp 103 and the legs of the base plate. These forms are fitted on the first bar 108, that here is a hollow, square rod which is standing on an edge. The clamps 102, 103 which have the touching projections 1022, 1032, are screwed on the base plate by means of screws 104, 105, in which the heads of the screws 104, 105 are in turn sunken into in enlargements 1021, 1031 of through holes in the clamps 102, 103. Otherwise, what has been said for the first embodiment is valid.

Figure 9:
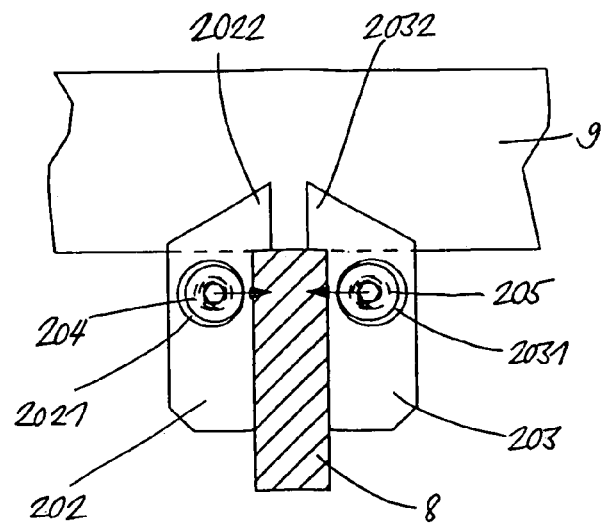
FIG. 9—shows a view from the front of a third embodiment of the cross clamping device of this invention with two clamped bars.

In the third embodiment of a cross clamping device of this invention according to FIG. 9 the projections 2022 and 2032 of the first clamp 202 and of the second clamp 203 do not touch, so that no torque is produced. The clamps 202, 203 are screwed by means of screws 204, 205 on the base plate, in which here also the heads of the screws 204, 205 are sunken into enlargements 2021, 2031 of through holes in the clamps 202, 203. Otherwise, what has been said for the first embodiment is valid.

Figure 10:
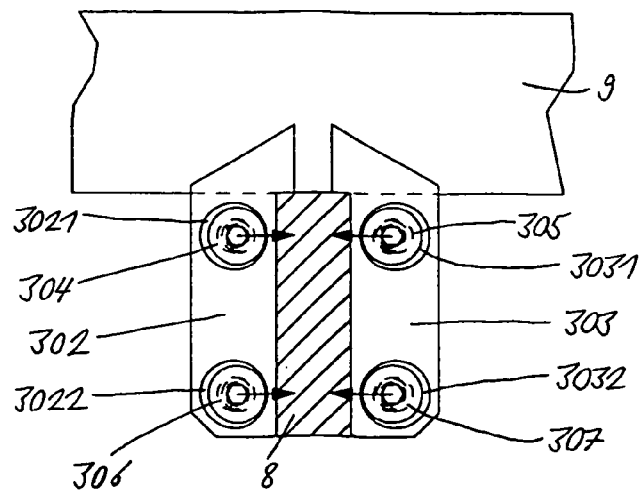
FIG. 10—shows a view from the front of a fourth embodiment of the cross clamping device of this invention with two clamped bars, that comprises two additional screws.

The fourth embodiment of a cross clamping device of this invention which is presented in FIG. 10 is differentiated from the third embodiment by the fact that the first clamp 302 and the second clamp 303 are screwed on not only by means of the first screw 304 or the second screw 305 respectively on each of the legs of the base plate, but another screw 306 or 307 respectively is present. The heads of the screws 304, 305, 306, 307 are in turn sunken into enlargements 3021, 3022, 3031, 3032 of the through holes in the clamps 302, 303. The additional screws 306, 307 ensure a greater clamping force in the direction of the marked arrows. Otherwise, what has been said for the third embodiment is valid.

For the previously described cross clamping device, further variants of construction are feasible. Here what should also be expressly mentioned is the fact that the through holes in the clamps 2, 3; 102, 103; 202, 203; 302, 303 can, instead of being elongated, also be round shaped with a diameter which is greater than the diameter of the shaft of each accompanying screw 4, 5; 104, 105; 204, 205; 304, 305, 306, 307, such that the ability of the clamps 2, 3; 102, 103; 202, 203; 302, 303 to move in relation to the screws 4, 5; 104, 105; 204, 205; 304, 305, 306, 307 is guaranteed.

What is claimed is:

1. A cross clamping device comprising: a base plate, which has a first and a second leg and a clamping piece which connects the two legs with each other, a first clamp, which by means of a first screw is screwed onto the first leg, and a second clamp, the second clamp being separate and distinct from the first clamp, which second clamp by means of a second screw is screwed onto the second leg, wherein the base plate and the two clamps are so formed that between the first and the second clamp a first bar, and between the two clamps and the clamping piece of the base plate a second bar, which is rotated by 90° in relation to the first bar, are able to be clamped, wherein the first and the second screw each have a head, which is at least partially conical shaped, so that by tightening of the first and of the second screw the first and the second clamps are pressed by the slanting conical surface against the first bar and the two bars are clamped.

2. The cross clamping device according to claim 1, wherein at least one of the two clamps is additionally screwed onto the accompanying leg of the base plate by means of a further screw.

3. The cross clamping device according to claim 1, wherein the screws each have a shaft with a thread and have a head, the first leg of the base plate has at least a first hole with a thread, in which the first screw is screwed, and the second leg of the base plate has at least a second hole with a thread, in which the second screw is screwed.

4. The cross clamping device according to claim 3, wherein at least one of the two clamps has a through hole, whose diameter at least in the direction towards the first bar is greater than the diameter of the screw shaft.

5. The cross clamping device according to claim 4, wherein the through hole or at least one of the through holes has an enlargement on the side opposite from the base plate, in which the head of the accompanying screw is at least partially inserted.

6. The cross clamping device according to claim 5, wherein the enlargement at least on the side on the same side as the first bar is bordered by a slanting surface of the clamp, so that in the tightening of the screw the clamp is pressed against the first bar by the screw which is pressing on the slanting surface.

7. The cross clamping device according to claim 1, wherein the clamping piece of the base plate is thinner than the two legs or the clamps in the region of the clamping piece of the base plate are thinner than in the region of the legs, so that between the two clamps and the clamping piece of the base plate a space is present, in which the second bar is able to be clamped, while the clamps lie on the legs.

8. The cross clamping device according to claim 1, wherein the two clamps each have at one of their ends a projection which extends to the other clamp and that the two projections touch each other.

9. The cross clamping device according to claim 1, wherein the two clamps lie flat on the first bar and on the second bar.

\* \* \* \* \*